May 4, 1943.  A. N. THOMAS  2,318,028
HYDRAULIC POWER TRANSMISSION DEVICE
Filed May 16, 1939  4 Sheets-Sheet 2

Inventor:
Albert N. Thomas
By: Frank Schraeder Jr
Attorney

May 4, 1943.   A. N. THOMAS   2,318,028
HYDRAULIC POWER TRANSMISSION DEVICE
Filed May 16, 1939   4 Sheets-Sheet 3

Inventor:
Albert N. Thomas.
By: Frank J. Schraeder Jr.
Attorney.

May 4, 1943.  A. N. THOMAS  2,318,028
HYDRAULIC POWER TRANSMISSION DEVICE
Filed May 16, 1939  4 Sheets-Sheet 4
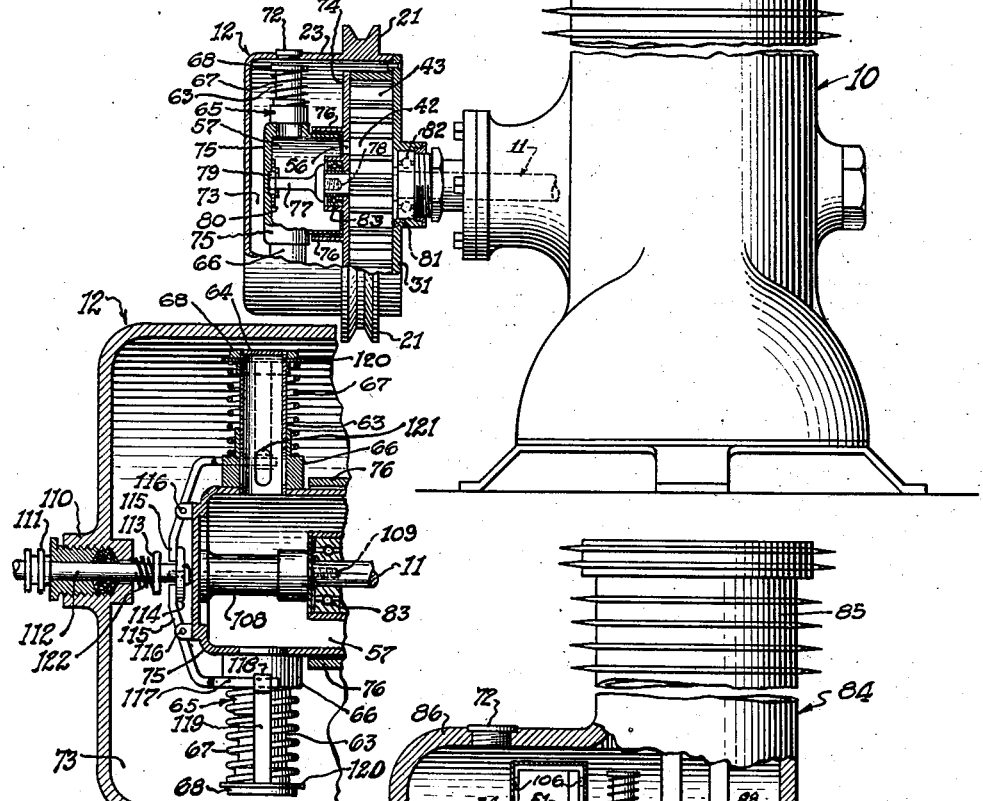
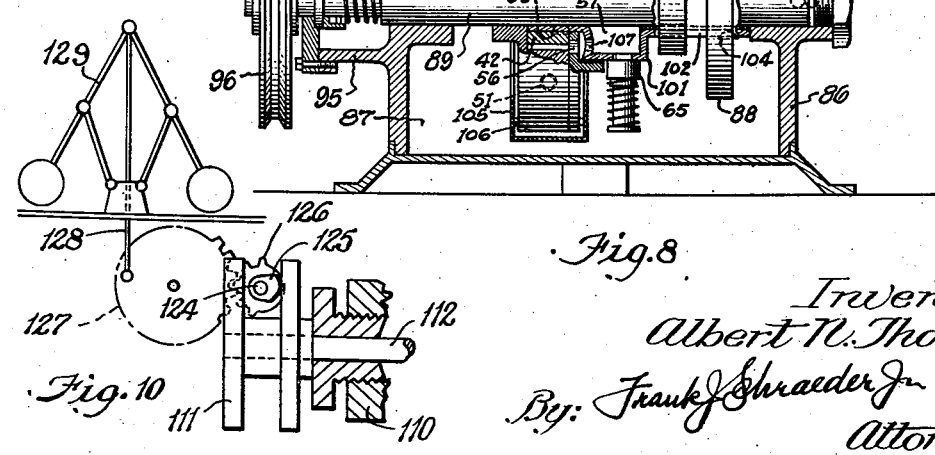
Inventor:
Albert N. Thomas
By: Frank J. Schraeder Jr.
Attorney.

Patented May 4, 1943

2,318,028

UNITED STATES PATENT OFFICE 2,318,028

HYDRAULIC POWER TRANSMISSION DEVICE

Albert N. Thomas, Dodge City, Kans., assignor to Thomas Hydraulic Speed Controls, Incorporated, Dodge City, Kans., a corporation of Kansas Application May 16, 1939, Serial No. 273,906

27 Claims. (Cl. 192—61)

This invention relates generally to new and useful improvements in hydraulic power transmission devices and has particular reference to novel hydraulic speed controls or regulators.

One of the objects of my invention is to provide a novel and efficient hydraulic device which is adapted to be interposed as a speed control mechanism between a driving member and a driven member and the operation or function of which device is such that the speed of the driven member is automatically controlled or maintained at a substantially constant predetermined speed notwithstanding variations in the speed of the driving member above a predetermined minimum speed.

It is also an object of my invention to provide a hydraulic speed control device of simple and comparatively low cost construction and which shall be hydraulically and mechanically balanced.

Among the more important novel features of my invention are the following:

Distribution of the pressure or torque loading around the pump central or sun gear to remove or reduce to a minimum radial loads on the main shaft bearings.

Intake tubes extending from the pump gear intake recesses close to the inside face of the casing affording efficient operation under wide variations in the amount of the fluid employed thereby insuring a circulatory flow of fluid.

A novel balanced governor design, construction and arrangement embodying a hollow hub constituting a stabilizing port affording equalization of fluid pressures in all gear and pressure passage recesses and which port communicates with a single or plurality (preferably two) of equally spaced radially disposed tubular members including centrifugally operable adjustable spring-pressed valves operatively responsive to varying speeds of the driven member for controlling the discharge of the fluid from said tubular members or pressure columns to thereby control the speed of the driven member and the speed of any device or mechanism operatively connected thereto.

Other novel features and objects of my invention will become readily apparent from the perusal of the attached drawings and following specification.

In the drawings, which show a preferred form or embodiment of my invention,

Figures 1, 2:
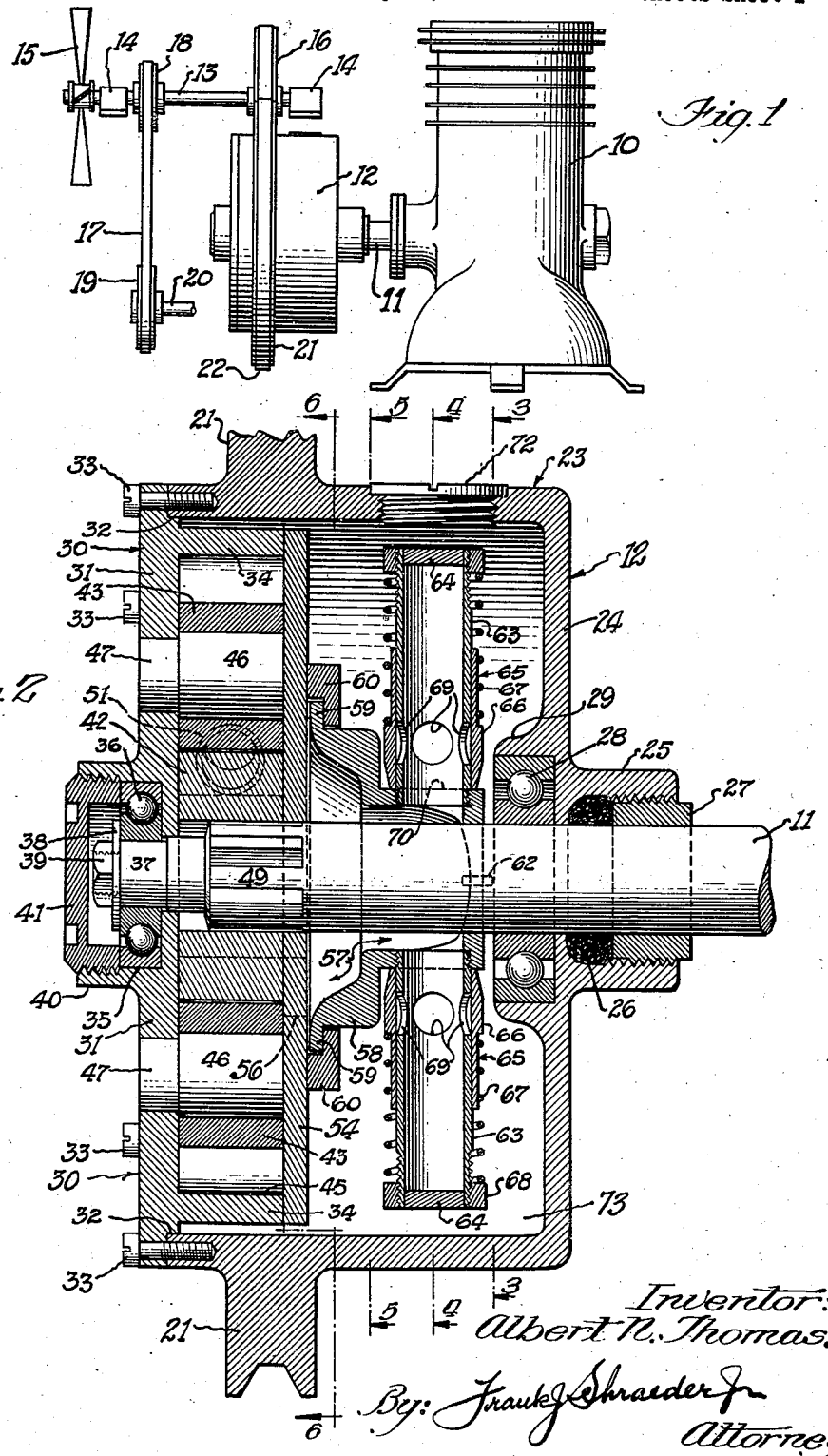
Fig. 1 is a side elevation of a speed control embodying my invention, shown applied to the crank shaft of a compressor.
Fig. 2 is an enlarged vertical section of a speed control or regulator embodying my invention.
Figure 3:
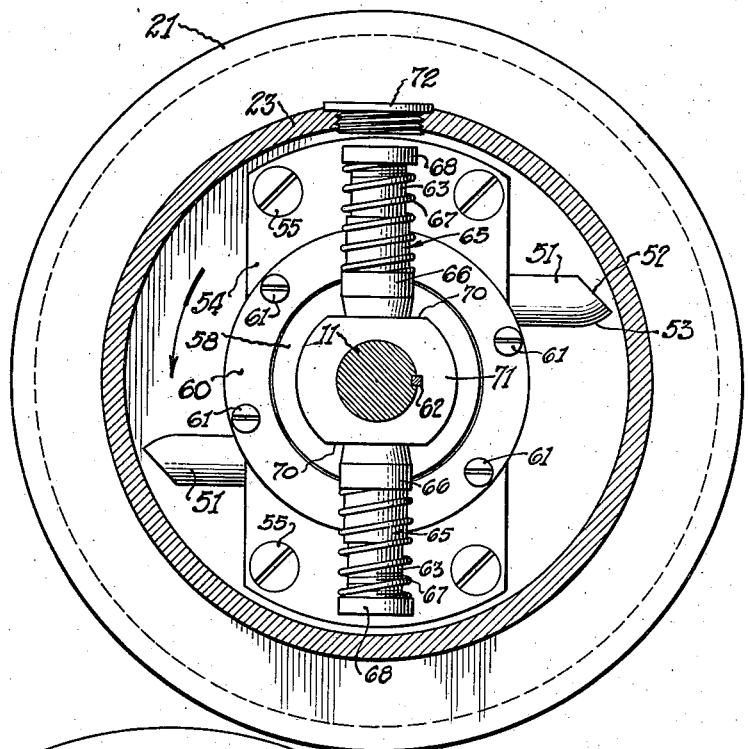
Figure 4:
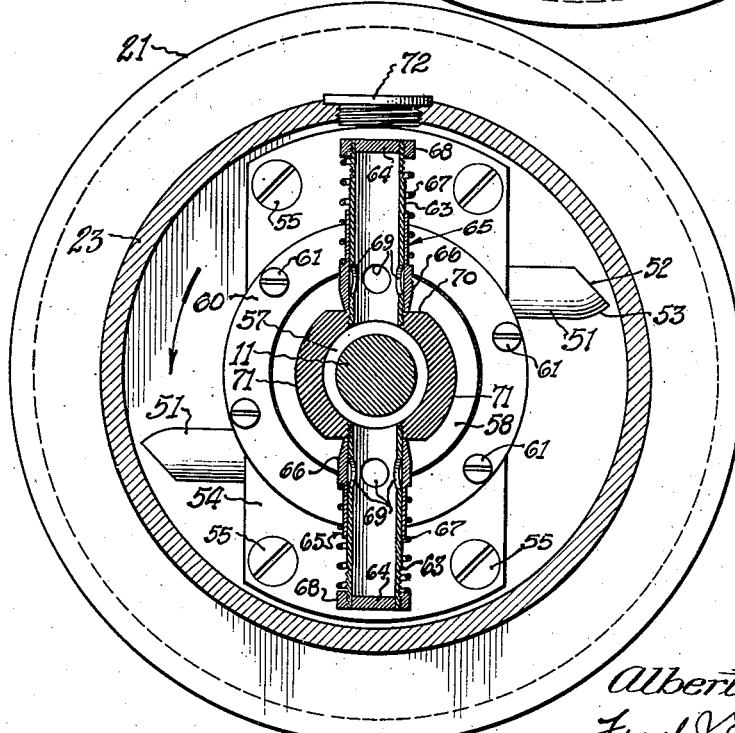
Figure 5:
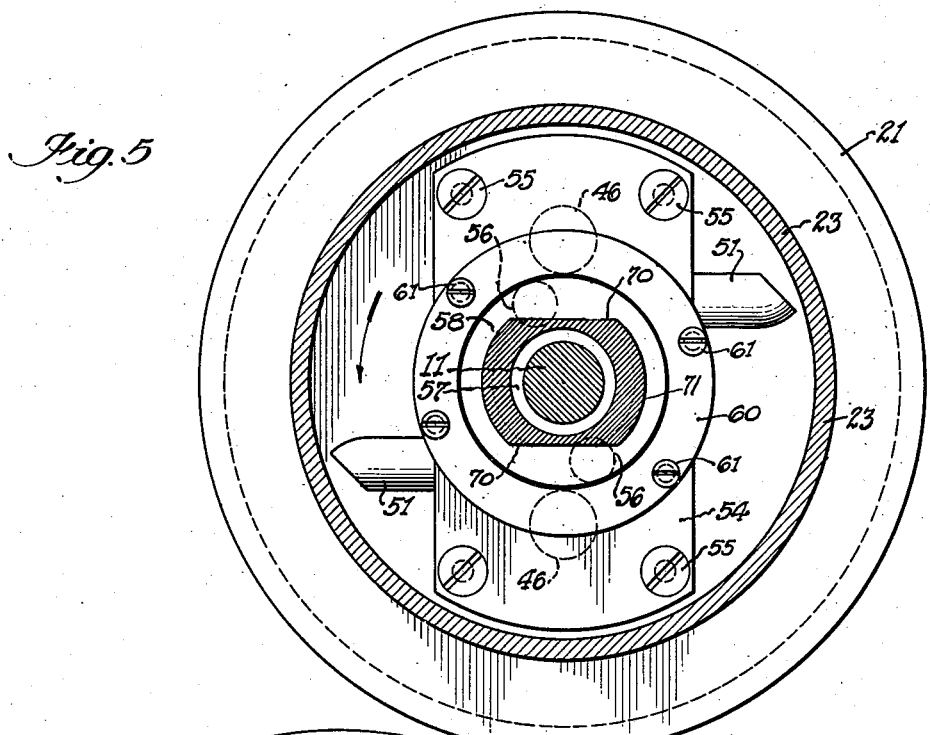
Figure 6:
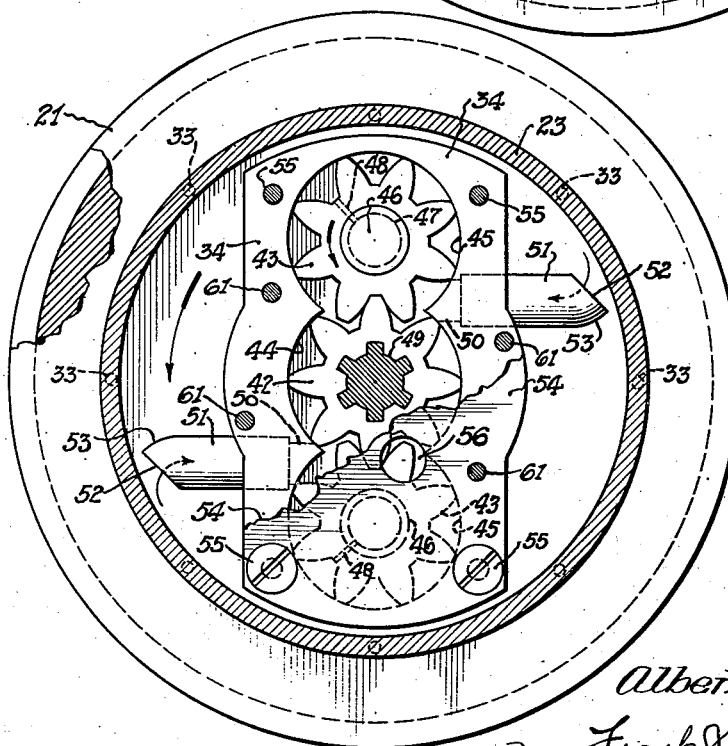

Figs. 3, 4 and 5 are vertical sections taken respectively on lines 3—3, 4—4 and 5—5 of Fig. 2 but slightly reduced in scale;

Fig. 6 is a vertical section, with parts in elevation, taken on line 6—6 of Fig. 2;

Fig. 7 is an illustration showing a modified form of my speed control applied to a compressor, the speed regulator parts being shown part in section and part in elevation;

Fig. 8 shows another modified form of my invention with parts in section and parts in elevation;

Fig. 9 shows a portion of the speed regulator in section with manually operable exteriorly controlled means for adjustably increasing or decreasing the speed of the driven shaft; and Fig. 10 is an enlarged sectional view of a portion of Fig. 9 showing automatically operable mechanical means for automatically changing the desired constant speed.

My invention, for purposes of illustration, is shown on the attached drawings and described herein as applied to a compressor for a refrigerating plant for material transporting vehicles or for air-conditioning apparatus for other vehicles such as automobiles wherein the driving member rotates at changing speeds and wherein it is desired to drive the compressor at a relatively substantially constant speed.

My control is adaptable for reverse operation to that herein illustrated, that is, the shaft extending into the casing of my control could be an extension of the armature shaft of a constant speed motor with the result that the casing becomes a driven member or pulley adapted for adjustment for various predetermined constant speeds other than that of the motor, or for adjustably varying the output speed of the control during the operation of the constant speed driving motor.

My invention may be used in installations where it is desired to maintain a relatively constant speed of a driven shaft and where the source of driving power is subject to changes in speed as in cases of overloads on motors; where fluctuations in electric power lines cause speed variation in electric motors; where motors are of necessity variable speed motors, as for example, automobile motors or engines; where variation in speed of drive shafts, as for example, in railway air-conditioning apparatus where the source of rotary power is the car axles; where variation of output speeds is desired to be changed from time to time and speed governed at those same points, as for example, selectively changing the rate of operation of pumps for oil wells which are driven by constant speed motors; where several machines are operated by one power plant or one source of power, and different speeds are desired for operating each of the several machines driven thereby, and in applications to constant static pressure blower drives in various industries.

Referring to the drawings, and particularly to Figs. 1 to 6 inclusive, 10 designates a compressor which may be considered as a part of air conditioning apparatus adapted for installation in an automobile or railway car, or the numeral 10 may be considered as designating any other mechanism, device or apparatus which is provided with a drive shaft 11 to be driven with a constant speed by a rotary power-driven member, mechanism or motor, the speed of which is changing from time to time, or the speed of which is different or greater than the substantially constant speed at which it is desired to rotate shaft 11.

My improved speed control or regulator is generally designated by numeral 12 and, as shown in Fig. 1, it is mounted on shaft 11 and interposed as a speed controlling regulator between the shaft 11 and an automobile fan shaft 13 which is shown mounted in bearings 14 and provided with the fan 15 and drive member or pulley 16. The fan shaft 13 is shown as being driven by a belt 17 trained around the pulley 18 fixed to the fan shaft 13 and pulley 19 fixed to a drive shaft 20 as, for example, the automobile engine crank shaft which rotates with variable or changing speeds.

The speed regulator unit 12 is preferably provided with a pulley 21 which is adapted to be driven with variable or changing speeds by the belt 22 trained over the drive member or pulley 16 fixed to the fan shaft 13.

As shown in Figs. 2, 3, 4, 5 and 6, the speed control or regulator 12 consists of a cylindrical fluid-tight rotatable casing 23 having an integral closure wall 24 at one end thereof provided with a centrally disposed integral hub-like extension 25 which surrounds the driven member or compressor shaft 11 and which extension 25 is formed to constitute a receptacle for any suitable packing 26 retained in place by a screw-gland nut 27.

The hydraulic regulator unit 12 is supported at its inner end on a suitable anti-friction ball bearing member 28 positioned within the inwardly disposed annular wall 29 formed integrally with the wall 24.

The outer end of the casing 23 is provided with a detachably mounted closure 30 constituting a combined unitary closure head and gear box and consisting of an end wall 31 having a peripheral recess 32 adapted to receive therein the circular outer end of the casing 23. The closure 30 is secured to the casing 23 by any suitable means as the plurality of machine screws 33. These secured parts 23 and 30 may be readily made fluid-tight by carefully machined connections or any suitable ring gasket (not shown) may be mounted between them.

As more clearly shown in Figs. 2, 5 and 6, the end closure wall 31 is provided with gear box 34 formed preferably integrally therewith.

The central outer portion of the end closure wall 31 is formed with recess 35 adapted to receive the anti-friction ball bearing 36 for support on the reduced end 37 of the shaft 11 and the lower race of this bearing is held in place by a washer 38 and nut 39 screw-mounted on the extreme outer end of shaft 11. The outer end of the recess 35 extends into the hub-like extension 40 which is formed integrally with the closure wall 31 and which extension 40 is interiorly threaded to receive therein a screw cap 41.

The fluid pumping means includes the centrally disposed sun or primary gear 42 and a plurality of circularly equally spaced planetary or secondary gears 43 operatively in mesh with the gear 42. To secure a balanced pumping means I have preferred to show a pair of diametrically oppositely disposed planetary gears 43.

The sun gear 42 is positioned within the central recess 44 of the gear box 34 and the planetary gears 43 are positioned for rotation in the recesses 45. It will be noted that these recesses 44 and 45 form substantially greatly extended fluid compression walls.

The planetary gears 43 are rotatably mounted on pins 46 which are supported in the end closure wall 31 on extensions 47 of decreased diameter and each of these planetary gears 43 is provided with a small oil passage 48 to insure proper lubrication of same.

The sun gear 42 is loosely splined or otherwise connected to a portion 49 of the shaft 11.

The gear box 34 is provided with a pair of fluid intake openings 50 slightly radially offset relatively to the pitch circle of the sun gear 42 to thereby increase the area of the fluid compression wall surrounding the sun gear. The intake openings 50 are each provided with a tubular intake extension 51 having an angularly cut intake end 52 with a deflected or curved end portion 53 which facilitate the flow of the fluid into the extensions 51.

It will be noted that these intake extensions 51 extend outwardly close to the inside face of the casing 23 to afford efficient operation under wide variations in the amount of the fluid employed.

The gear box 34 is provided with a cover plate 54 which is secured thereto by screws 55 and two fluid discharge openings 56 are provided for discharging the fluid from the pump gears into a common pressure stabilizing port or chamber 57 which is formed within the governor hub 58.

The governor hub 58 is secured in any suitable manner, as by key 62, to the shaft 11 and is formed with an outer peripheral flange portion 59 which is adapted to rotate within the retaining ring 60 of L-shaped cross-section and which retaining ring 60 is secured by screws 61 to the outer face of the gear box cover plate 54.

My improved governor includes not only the hub 58 but preferably two oppositely disposed valve members each including a valve 65 and a tubular sleeve 63 the inner end of which has threaded connection with the rotatable hub 58 and communicates with the fluid pressure stabilizing port 57 to receive therein the fluid which is discharged under pressure from the gear pumping elements during the operation of the unit.

The outer end of each sleeve 63 is closed in any suitable manner as by the plug 64 securely mounted therein.

A tubular valve 65 is mounted for sliding movement on each of the sleeves 63, and each valve 65 is adapted, as with a collar 66, to be engaged by the inner end of a coil spring 67. The outer end of the spring 67 is in abutment with the adjustable spring retaining nut 68 to thus normally hold the valve in closed position completely covering preferably a plurality of discharge openings 69 in sleeve 63, preferably located near the inner end thereof. In normal inoperative closed position, the inner ends of the tubular sleeve valves are forced by the coil springs 67 to be seated upon the flattened faces 70 of the hub extension 71.

Some of the distinctive and novel features of my improved governor are:

The hollow governor hub 58 provides a pressure stabilizing port to insure equalization of fluid pressures in all fluid outlet ports;

The governor elements are in balanced arrangement about their supporting hub;

Plurality of discharge openings are provided for equalization of pressure upon the valves;

Radially movable speed control valves are provided for operation directly responsive to centrifugal force; and Means for adjusting the speed controlling valves for varying the rate of the constant speed output of the unit may be afforded by substitution of valve springs of varying physical properties, by substitution of values of lighter or heavier weight, or by increasing or decreasing the tension of the valve springs.

Rotary power is applied, as by the belt 22, to the pulley 21 or directly to the casing 23 which is operatively associated with the shaft 11 of compressor 10 or any other mechanism or apparatus which is to be driven by shaft 11 on which the primary gear is mounted. In the initial application of power there is a noticeable cushioning effect at the start because some relative movement between the sun and planetary gear elements occurs until the fluid pressure prevents such relative movement. The driving and driven elements operate at substantially the same speed up or down through a certain speed range until or when the speed of the driving element or member reaches a certain predetermined speed which would cause the driven element or member to be driven with a speed in excess of the desired constant speed. At this time the governor elements and movable valve 65 become automatically operative responsive to centrifugal force to progressively open the pressure column discharge ports 69 so that the driven shaft 11 remains at the desired predetermined substantially constant speed, the movable valve 65 metering the discharge of the fluid under pressure to thereby control the relative movement of the sun and planetary gear elements to maintain the driven shaft 11 at the desired predetermined substantially constant speed.

The casing 23 is preferably filled one-third to two-thirds full with oil through an opening therein which is normally closed by the screw plug 72. From the intake ends of the extensions 52 of the intake tubes 51, which are in close proximity to the inner face of the oil reservoir 73 within the casing 23, the oil flows directly into the pump gear compartments and through these compartments into the port 57 of the governor hub 58 to be discharged into the radial governor tubes 63 and then transversely to their longitudinal axis into the storage chamber 73. The oil is thrown toward the casing wall 23 by centrifugal force, and then moves in a lineal direction to the intake tubes 51 to follow this described path again. It can be readily understood that such circulation insures a constant thorough mixing of the oil, and that any heat generated by the rotating parts of the pumping means will be carried to the outer portions of the casing which is rotating at the driving instead of driven speed, so that any excessive heat will be dissipated to a point well within commercial practice without possible use of heat-dissipating fins. My experience in actual practice indicates that the temperatures developed in this unit under various operations at ratios even up to 4 or 5 to 1 are substantially within about 4 or 5 degrees of that of the atmosphere.

I have preferred to show two radially and diametrically oppositely disposed governor valves.

It is to be noted that no slidable or rotating elements protrude outside of the casing 23 other than the driven shaft 11, or the manual control, shown in Fig. 9. The driven shaft, if it passes through the oil reservoir and end closure plate, is not submerged in the oil when the unit is rotating, and there is no working hydraulic pressure in the oil reservoir, and therefore the packing 26 at this point is reduced in commercial practice to just sufficient means to keep the oil from leaking out by gravity flow when the unit is not in operation, if the level of the oil is above the shaft line.

The fill plug 72 may be located to conveniently permit filling and draining of the unit, but I have in commercial practice located the plug 72 in radial alignment with the governor tubes 63 to permit adjustment of the nuts 68 for adjustably varying the tension of the springs 67 to afford changing output speeds when desired without the necessity of dismantling the unit. Of course, this is of no consequence where a manual, or governor-actuated controls, such as indicated in Figs. 9 and 10, is used.

The usual gaskets, or a machined fit to component parts to a degree where gaskets are not required, may be used to form oil tight joints.

In the following description of the modified forms of my invention shown in Figs. 7, 8 and 9 identical reference numerals are used for the parts and members shown therein which are like or similar to those shown in Figs. 1 to 6 inclusive.

In Fig. 7 I show a modified governor and a mounting of the speed control unit which is relatively reverse to that shown in Figs. 1 to 6 inclusive. The pumping elements are mounted on the compressor side of the unit and the compressor shaft 11 extends into a bearing 83 which is carried on the gear box cover plate 74 but such shaft 11 does not extend through the oil reservoir housing 23 nor does it extend through the high pressure hub 75 of the governor. An advantage of such reverse mounting of the regulator unit is that the heavier side of the unit is positioned close to the outer shaft bearing of the compressor 10.

As shown in Fig. 7 the hub 75 is arranged for rotation within the annular wall 76 carried on cover plate 74. The governor hub is operatively connected to the end of shaft 11 by means of a flanged connecting stud 77 one end of which is threaded, as at 78, into the end of shaft 11 and the outer end of which is provided with a connection 79 seated within the inner face of the governor hub wall and held against displacement by a strap 80 also secured to the governor hub wall.

Fig. 7 also shows a duct 81 which may be cored or preferably drilled into the gear box to extend from a point beyond the bearing 82 into a suction area of the gear pump to keep the bearing 82 and packing gland area free from any excess oil which might seep therein. One of the oil discharge openings 56 is shown in the cover plate 74.

Fig. 8 shows a refrigerator compressor 84 combined with a speed control. This type of compressor is readily adaptable for installation in connection with refrigerator plants for trucks, air conditioning apparatus for automobiles, buses or other vehicles where the power-driven member for actuating same is driven with varying speeds and where it is desired to operate such compressor with substantially constant speed.

The compressor 84, as shown in Fig. 8, includes the piston cylinders 85 and the housing 86 which encloses the oil chamber 87 in which is mounted the compressor operating mechanism including the piston operating eccentrics 88, the speed control and its governor.

The shaft 89 is suitably supported in bearings 90 and 91. The end of the shaft 89 supported in bearing 91 is provided with an end thrust ball bearing 92 secured in adjusted position by the screw cap 93. The opposite end of the shaft 89 extends through the bearing 90 and is provided with a spring-pressed conventional seal generally indicated by numeral 94 which is housed in the extension 95 of the compressor housing 86.

The outer end of the shaft 89 is provided with a pulley 96 which is secured to the shaft 89 and adapted to be belt-driven from any suitable drive or power-take-off shaft rotating with varying speeds.

The extended hub 97 of the gear box 34 is operatively secured to the shaft 89, as by key 98, so that the gear box 34 and the two planetary gears (not shown) which are supported on such gear box 34 will be rotated by the shaft 89. The sun gear 42 is operatively secured to the sleeve extension 100 of the governor hub 101, as by key 99, so that the governor hub 101 and sun gear 42 are operatively interconnected. The governor hub 101 is also provided with an integral sleeve extension 102 mounted upon the tubular bearing 103 which is freely rotatable on the shaft 89. The tubular bearing 103 and the hub sleeve extension 102 extend through the eccentrics 88.

Each eccentric 88 is operatively connected to the governor sleeve extension 102 as by the key 104.

As shown in Fig. 8, the pulley 96, which is driven with a varying or periodically changing speed, imparts a variable speed to the shaft 89 and through the key 98 such motion is transmitted through hub 97 to the gear box 34 and the planetary gear system therein to the governor hub 101 which is keyed, as at 99, to the sun gear 42.

As shown in Fig. 8, the gear box 34 is provided with a circular trough 105 which is secured to the gear box 34, as by spaced rivets or pins 106, so as to rotate as a unit with the gear box 34. The fluid in the housing chamber 87 will readily flow into the trough 105 over the side walls thereof and when the pump is bodily rotated an annular body of the fluid will be maintained in the trough through centrifugal force. The pump inlet tubes 51, which are similar in construction to those shown in Figs. 3, 4, 5 and 6, extend in proximity of the lateral wall of the trough 105 to receive the fluid therefrom and to feed same into and through the planetary gear system and through the pump discharge openings 56 and thence through one or more passages 107 into the governor pressure equalizing port 57 for metered control by the valves 65 responsively to centrifugal force.

In the fragmentary vertical section of the speed control 12 shown in Fig. 9 which is an enlarged end portion of the casing shown in Fig. 7, the end of the driven shaft 11 is shown supported in the ball bearing 83.

The governor hub 75 is operatively connected to the end of shaft 11 by means of a flanged connecting stud 108 formed integrally with or otherwise connected to the outer end wall of the hub 75 and having a threaded end connection 109 with the end of shaft 11.

Means for adjustably varying the speed of the driven shaft 11 during the rotation of the speed control unit 12 is provided and, as shown in Fig. 9, such means comprises a member 112 slidably mounted in the casing hub 110. This speed adjustment member 112 consists of a round rod provided with a pair of disk-like members 113 and 114 formed or otherwise secured on the inner end thereof. As shown in Fig. 9, the rod 112 is positioned in its normal inoperative position with the collar 111 brought into engagement with the packing nut of the hub 110 by the coil spring 122 which is positioned between the hub 110 and the disk 113.

Each of the two tubular governor valve members is provided with a circular collar 120 disposed at the outer end of the spring 67. Each collar 120 is provided with a pair of integral stirrups or side bars 119 terminating at their inner ends in U-shaped formations 118 which are adapted to be engaged by the forked ends 117 of the operating arm 115 pivotally mounted as at 116 on ears formed integrally with the governor hub 75.

It will be observed that when the rod 112 is shifted to the left, as shown in Fig. 9, against the pressure of spring 122, the disk 114 will simultaneously engage and move the arms 115 about their pivots 116 to cause the forked ends 117 to move the side bars 119 inwardly to compress the springs 67 so that the pressure exerted upon the enlarged valve ends 66 is increased and therefore a correspondingly greater resistance is imposed upon the valves 65 so that greater pressure of the fluid and increased revolutions for speed of the unit 12 will be required to cause a displacement of the valves to permit the escape of the fluid from the high pressure chamber 57 through the valve discharge openings 121 and therefore the desired constant speed of shaft 11 will be increased correspondingly to the extent of the movement of the rod 112.

It is obvious that the speed of shaft 11 may be adjustably varied manually by the shifting of rod 112 and that the rod 112 may be arranged to be shifted by suitable automatically operable mechanical means.

An example of automatically operable means for periodically changing the normal maximum constant speed is shown in Fig. 10, wherein a slowly rotatable shaft 124 is provided with a cam 125 which is in engagement with the collar 111 and adapted to shift the collar 111 and rod 112 to thereby further compress the valve springs 67 so that the desired constant speed will be periodically increased or decreased correspondingly with the movement of the rod 112 by cam 125, through the gears 126 and 127 which are movable by the rod 128 of the governor 129.

It will be readily apparent to those skilled in the art to which this invention appertains that the driving and driven members will operate or rotate at substantially the same speed or speeds until the speed of the driven member reaches the predetermined constant speed at which it is to operate.

In the specification the driving means or member is described as being operable at variable speeds and it is to be understood that "variable speeds" is used generically to define such driving means or member which constitutes any type of motor, mechanism or member which is rotatable with varying speeds, or is rotating with periodically changing speeds or with a constant speed which is different than the speed of the driven member, since the hydraulic control or regulator herein disclosed, in its preferable construction and operation, is adapted to be used with such diverse types of driving means or member.

I claim:

1. Driving means operable at variable speeds, a rotatable driven member, and hydraulic power transmitting means operatively interposed between said driving means and said driven member comprising a rotatable casing constituting a receptacle having a fluid chamber therein, said casing being operatively connected with said driving means, fluid pumping means within said casing adapted for circulating the fluid through said pumping means whereby an operative connection is established between said rotatable casing and said rotatable driven member, and speed regulating means mounted wholly within said casing operatively responsive to centrifugal force and connected to said driven member for regulating the flow of the fluid from said pumping means into the fluid chamber within the casing whereby said driven member is controlled to rotate with a substantially constant speed after the speed of the driving means has reached a predetermined rate.

2. Driving means operable at variable speeds, a rotatable driven member, and hydraulic power transmitting means operatively interposed between said driving means and said driven member comprising a rotatable casing having a fluid chamber and operatively connected with said driving means, fluid pumping means within said casing adapted for circulating the fluid through said pumping means whereby an operative connection is established between said rotatable casing and said rotatable driven member, speed regulating means mounted within said casing operatively responsive to centrifugal force and connected to said driven member for regulating the flow of the fluid from said pumping means into the fluid chamber within the casing whereby said driven member is controlled to rotate with a substantially constant speed after the speed of the driving means has reached a predetermined rate, adjustable means operatively associated with said speed regulating means adapted to adjustably vary said constant speed, and means operable exteriorly of the casing connected to said adjustable means for varying the speed of the driven member.

3. In a hydraulic speed control, an enclosed casing having a fluid compartment therein and adapted to be rotated by a driving member rotating at variable speeds, a driven shaft extending into said casing, fluid pumping means mounted within said casing and operatively connected with said casing and adapted for circulating the fluid therethrough whereby an operative connection is established between said pumping means and said driven shaft, and rotatable governor means adapted for controlling the circulation of the fluid responsively to centrifugal force, said governor means being disposed within said casing and operatively connected to and rotatable with said driven shaft and having a fluid-receiving connection adapted to receive the discharged fluid directly from said pumping means whereby said driven shaft is controlled so that it will rotate with a constant speed after the rotary speed of the casing has reached a predetermined rate.

4. In a constant speed power-transmitting system, the combination of a power-actuated rotatable driving member, a driven member, and hydraulic speed regulating means operatively connected to and between said members comprising a rotatable casing driven by said driving member and having a single fluid chamber therein, fluid pumping means within said chamber operatively connected to said casing and to said driven member, and a governor comprising a hollow hub operatively connected to said driven member and having a high pressure fluid port, said pumping means being actuated by the relative movement between said casing and said driven member for pumping the fluid from said chamber into said high pressure governor port, said governor including fluid metering means for said high pressure fluid port operatively responsive to centrifugal force whereby said driven member is controlled to rotate with a substantially constant speed after the rotary speed of the driving member has reached a predetermined rate.

5. In a hydraulic speed control as embodied in claim 3 and including fluid inlet means for said pumping means extending in proximity to the inner face of the side wall of the casing.

6. In a constant speed power transmitting system as embodied in claim 4 wherein said pumping means includes a planetary gear pumping system, and a pair of tubular fluid inlet members extending in proximity to the inner face of the side wall of said casing.

7. In a hydraulic constant speed control having an enclosed casing rotatable with varying speeds and having a fluid chamber, pumping means within said chamber and a rotary driven member extending into said chamber, a governor operatively connected to said driven member and comprising a hub mounted on said driven member and having a port therein adapted to receive the fluid from said pumping means, and a plurality of equally spaced radially disposed tubular members each provided with a discharge opening and a spring-pressed valve for controlling the discharge of the fluid through said discharge opening, said valve being operatively responsive to centrifugal force.

8. In a hydraulic speed control, an enclosed casing having a fluid compartment therein and adapted to be rotated by a driving member rotating at variable speeds, a driven shaft extending into said casing, fluid pumping means mounted within said casing and operatively connected with said casing and adapted for circulating the fluid therethrough whereby an operative connection is established between said pumping means and said driven shaft, rotatable governor means operatively responsive to centrifugal force disposed within said casing, said centrifugal force responsive rotatable means being operatively connected to and rotatable with said driven shaft and having a fluid-receiving connection adapted to receive the discharged fluid directly from said pumping means before its discharge into said casing whereby said driven shaft is controlled so that it will rotate with a constant speed after the rotary speed of the casing has reached a predetermined rate, and including means operable extraneously of the casing for adjustably controlling the governor during the operation or stationary position of the speed control to thereby vary the speed of the driven shaft.

9. In a constant speed power transmitting system, the combination of a power-actuated rotatable driving member, a driven member, and hydraulic speed regulating means operatively connected to and between said members comprising a rotatable casing driven by said driving member and having a single fluid chamber therein, fluid pumping means within said chamber operatively connected to said casing and to said driving member, a governor comprising a hollow hub operatively connected to said driven member and having a high pressure fluid port, said pumping means being actuated by the relative movement between said casing and said driven member for pumping the fluid from said chamber into said high pressure governor port, said governor including fluid metering means for said high pressure fluid port operatively responsive to centrifugal force whereby said driven member is controlled to rotate with a substantially constant speed after the rotary speed of the driving member has reached a predetermined rate, and including means operable extraneously of the casing for adjustably controlling the governor fluid metering means during the operation or stationary position of the speed control to thereby vary the speed of the driven member.

10. In a constant speed power transmitting system, the combination of a power-actuated rotatable driving member, a driven member, and hydraulic speed regulating means operatively connected to and between said members comprising a rotatable casing driven by said driving member and having a single fluid chamber therein, fluid pumping means within said chamber operatively connected to said casing and to said driven member, a governor comprising a hollow hub operatively connected to said driven member and having a high pressure fluid port, said pumping means being actuated by the relative movement between said casing and said driven member for pumping the fluid from said chamber into said high pressure governor port, fluid metering means operatively responsive to centrifugal force whereby said driven member is controlled to rotate with a substantially constant speed after the rotary speed of the driving member has reached a predetermined rate, said metering means comprising a pair of diametrically oppositely disposed tubular members having closed outer ends and inner ends in open communication with said hub high pressure port, each of said tubular members having a discharge opening, spring-pressed valves responsive to centrifugal force for controlling the discharge of the fluid from said discharge openings, and means operable extraneously of said casing for adjustably controlling and varying the extent of the spring pressure against said valves during the rotation of said casing.

11. In a hydraulic speed control as embodied in claim 3, and including a drain duct within the hub of the casing supporting a bearing for the driven shaft, said duct extending into a suction area of the fluid pumping means whereby the stuffing box of said bearing is maintained free of excess oil which might pass therein.

12. In a hydraulic speed control including a rotatable cylindrical casing enclosing a fluid-containing chamber, a driven shaft extending into said casing, a pump mounted within said casing forming an operative power-transmitting connection between said casing and said driven shaft, a fluid inlet for said pump having an inlet opening disposed close to the side wall of said casing, and a governor operatively responsive to centrifugal force mounted on said shaft within said casing including a tubular member disposed radially to the longitudinal axis of said driven shaft adapted to receive the fluid discharged from said pump and having a fluid discharge opening therein for discharging the fluid into said fluid chamber, and a spring-pressed valve for said tubular member discharge opening for controlling the discharge of the fluid therefrom responsively to centrifugal force.

13. Driving means operable at variable speeds, a rotatable driven member, and hydraulic power transmitting means operatively interposed between said driving means and said driven member comprising a rotatable casing having a fluid chamber and operatively connected with said driving means, fluid pumping means within said casing adapted for circulating the fluid through said pumping means whereby an operative connection is established between said rotatable casing and said rotatable driven member, and adjustable speed regulating means mounted within said fluid chamber operatively responsive to centrifugal force and connected to said driven member for regulating the flow of the fluid through and from said pumping means before its discharge into the fluid chamber whereby said driven member is automatically controlled to rotate with a substantially constant speed after the speed of the driving means has reached a predetermined rate and speeds exceeding such predetermined rate.

14. In constant speed hydraulic power-transmitting apparatus, the combination with a variable speed driving member, of a casing having a fluid chamber including fluid pumping means mounted within said casing and adapted to be driven by said driving member, a driven member, speed regulating means mounted within said casing operatively responsive to centrifugal force and operatively associated with said pumping means and operatively connected to said driven member and adapted for regulating the flow of the fluid through and from the said pumping means into the fluid chamber whereby said driven member is automatically controlled to rotate with a substantially constant speed after the speed of the driving member has reached a predetermined rate and speeds exceeding such predetermined rate.

15. In the constant speed hydraulic power transmitting apparatus as embodied in claim 14 and including said pumping means comprising a plurality of fluid inlet passages, a sun gear operatively connected with said driven member, a plurality of planetary gears operatively connected to said casing, fluid discharge passages for discharging the fluid into said speed regulating means, and said speed regulating means having a plurality of radially disposed high pressure fluid receiving ports communicating with a common chamber adapted to receive the pump-discharged fluid from said pump-discharge passages, and a spring-pressed valve for each of said ports operatively responsive to centrifugal force for controlling the discharge of the fluid into the fluid chamber whereby the speed of said driven member is automatically maintained at a substantially constant speed after the speed of the said driving member has reached a predetermined rate and speeds exceeding such predetermined rate.

16. In a hydraulic constant speed control, an enclosed casing having a fluid chamber and fluid pumping means operatively connected to said casing, said casing being rotatable with varying speeds, an extended fluid inlet for said pumping means extending in proximity of the inner face of the side wall of said casing, a driven shaft operatively connected to said pumping means, and a governor operatively connected to said driven shaft including means for receiving the fluid discharged from said pumping means and by-passing the fluid through said governor into said chamber, said governor having a valve operatively responsive to centrifugal force whereby the speed of said driven shaft is so controlled that its speed will be maintained constant after the rotary speed of said casing has reached a predetermined rate.

17. In a hydraulic speed control including a rotatable cylindrical casing enclosing a fluid-containing chamber, a driven shaft extending into said casing, a pump mounted within said casing forming an operative power-transmitting connection between said casing and said driven shaft, a fluid inlet for said pump, and a governor operatively responsive to centrifugal force mounted on said shaft within said casing including a ported member disposed radially to the longitudinal axis of said driven shaft adapted to receive the fluid discharged from said pump and having a fluid discharge opening therein for discharging the fluid into said fluid chamber, and a valve for said tubular member discharge opening for controlling the discharge of the fluid therefrom responsively to centrifugal force.

18. The combination embodied in claim 2 and including automatically operable mechanical means for operating said means operable exteriorly of the casing, for automatically regulating said speed regulating means to thereby change the controlling constant speed responsively to the movement of the automatically operable mechanical means.

19. In a mechanism having a stationary housing enclosing a fluid chamber therein, driven means in said chamber, and power-actuated driving means driven at variable speeds and extending into said fluid chamber, in combination with a constant speed control interposed in said chamber between said driving means and said driven means including fluid pumping means operatively connected to said driving means, a speed regulator operatively associated with said pumping means, operatively connected to said driven means, and operatively responsive to centrifugal force for regulating the flow of the fluid through and from said pumping means into said fluid chamber whereby the speed of said driven means is automatically maintained at a predetermined substantially constant speed after the speed of said driving means has reached a predetermined rate and speeds exceeding such predetermined rate.

20. Driving means operable at variable speeds, a rotatable driven member, and hydraulic power transmitting means operatively interposed between said driving means and said driven member, said hydraulic power transmitting means including a rotatable casing having a fluid chamber and operatively connected with said driving means, fluid pumping means within said casing adapted for circulating the fluid through said pumping means whereby an operative connection is established between said rotatable casing and said rotatable driven member, and speed regulating means mounted within said fluid chamber operatively associated with said driven member and operatively responsive to centrifugal force for regulating the flow of the fluid through said pumping means whereby said driven member is controlled to rotate with a substantially constant speed after the speed of the driving means has reached or exceeds a predetermined rate.

21. In constant speed hydraulic power-transmitting apparatus, the combination with a variable speed driving member, of a casing having a fluid chamber, fluid pumping means within said chamber adapted to be driven by said driving member, a driven member, speed regulating means connected to and rotatable with the driven member mounted within said casing, operatively responsive to centrifugal force, and operatively associated with said pumping means for regulating the flow of the fluid through said pumping means into the fluid chamber whereby said driven member is rotated with a constant speed during speeds of the driving member exceeding a predetermined rate.

22. In the constant speed hydraulic power transmitting apparatus as embodied in claim 21 wherein said pumping means includes a fluid inlet passage, a sun gear operatively connected to said driven member, a planetary gear rotatably supported on said casing, a fluid discharge passage for discharging the fluid from said pumping means into said speed regulating means, and said speed regulating means including a radially disposed high pressure fluid receiving port adapted to receive the pump-discharged fluid from said pump fluid discharge passage, and a spring-pressed valve for said port operatively responsive to centrifugal force for controlling the discharge of the fluid into the fluid chamber whereby the speed of said driven member is automatically maintained at a substantially constant speed during speeds of the said driving member exceeding a predetermined rate.

23. In a mechanism as defined in claim 19 and including a rotatable trough within said housing providing a continuous supply of fluid for said pumping means.

24. In a mechanism as defined in claim 19 and including means providing a continuous supply of fluid for said pumping means.

25. In constant speed hydraulic power-transmitting apparatus, the combination with a variable speed driving member, of a casing having a fluid chamber, fluid pumping means actuated by rotation of said casing by said driving member, a driven member, speed regulating means within said casing mounted to rotate with said driven member, operatively responsive to variable speeds of said driven member, and operatively associated with said pumping means for controlling the flow of the fluid through said pumping means into the fluid chamber whereby said driven member is rotated with a constant speed during variable speeds of said driving member after the speed of the driving member has reached or exceeds a predetermined rate.

26. The combination with driving means operable at variable speeds and a driven member, of hydraulic power-transmitting means interposed between said driving means and said driven member, said hydraulic power-transmitting means including a rotatable casing operatively connected with said driving means and having a fluid chamber therein, a fluid in said chamber, fluid-circulating means having component parts operatively associated with said driving means and with said driven member, said fluid constituting a fluid-resistant interposed between said component parts for imparting rotary motion from said rotatable casing to said driven member, and a governor within said fluid chamber mounted to rotate with said driven member and operatively associated with the fluid outlet of said fluid-circulating means, said governor being operatively responsive to centrifugal force for controlling the flow of said fluid through said fluid-circulating means whereby said driven member is rotated with a constant speed during variable speeds of said driving means after the speed of said driving means has reached or exceeds a predetermined rate.

27. The combination defined in claim 26 and wherein said governor includes fluid-metering means operatively responsive to centrifugal force, and means operable extraneously of said casing and operatively connected to said fluid-metering means adapted to adjustably vary the centrifugal responsiveness of said fluid-metering means, during the rotation or stationary position of said casing, to thereby vary the rate of said constant speed of said driven member.

ALBERT N. THOMAS.